(No Model.) 3 Sheets—Sheet 1.

S. S. WILLIAMSON.
APPARATUS FOR MANUFACTURING DRESS SHIELDS.

No. 499,272. Patented June 13, 1893.

WITNESSES:
J. Finch.
Fred Allibone

INVENTOR
Saml. S. Williamson.
BY
T. W. Smith Jr.
ATTORNEY (No Model.) 3 Sheets—Sheet 2.

S. S. WILLIAMSON.
APPARATUS FOR MANUFACTURING DRESS SHIELDS.

No. 499,272. Patented June 13, 1893.

(No Model.) 3 Sheets—Sheet 3.
S. S. WILLIAMSON.
APPARATUS FOR MANUFACTURING DRESS SHIELDS.
No. 499,272. Patented June 13, 1893.

WITNESSES:

INVENTOR
Saml. S. Williamson.
BY
ATTORNEY

UNITED STATES PATENT OFFICE.

SAMUEL S. WILLIAMSON, OF BRIDGEPORT, CONNECTICUT.

APPARATUS FOR MANUFACTURING DRESS-SHIELDS.

SPECIFICATION forming part of Letters Patent No. 499,272, dated June 13, 1893.

Application filed June 24, 1891. Renewed November 16, 1892. Serial No. 452,174. (No model.)

*To all whom it may concern:*

Be it known that I, SAMUEL S. WILLIAMSON, a citizen of the United States, residing at Bridgeport, in the county of Fairfield and State of Connecticut, have invented certain new and useful Improvements in Apparatus for Manufacturing Seamless Dress-Shields; and I do hereby declare the following to be a full, clear, and exact description of the invention, such as will enable others skilled in the art to which it appertains to make and use the same.

My invention relates to certain new and useful improvements in apparatus for shaping and vulcanizing seamless dress shields, and has for its object to produce a finished shield which shall be uniformly stretched and which shall not be vulcanized in the least degree until the stretching is completed.

My invention contemplates the use of what is known as stockinet faced rubber, and will be best understood by reference to the following drawings, in which—

Figure 1:
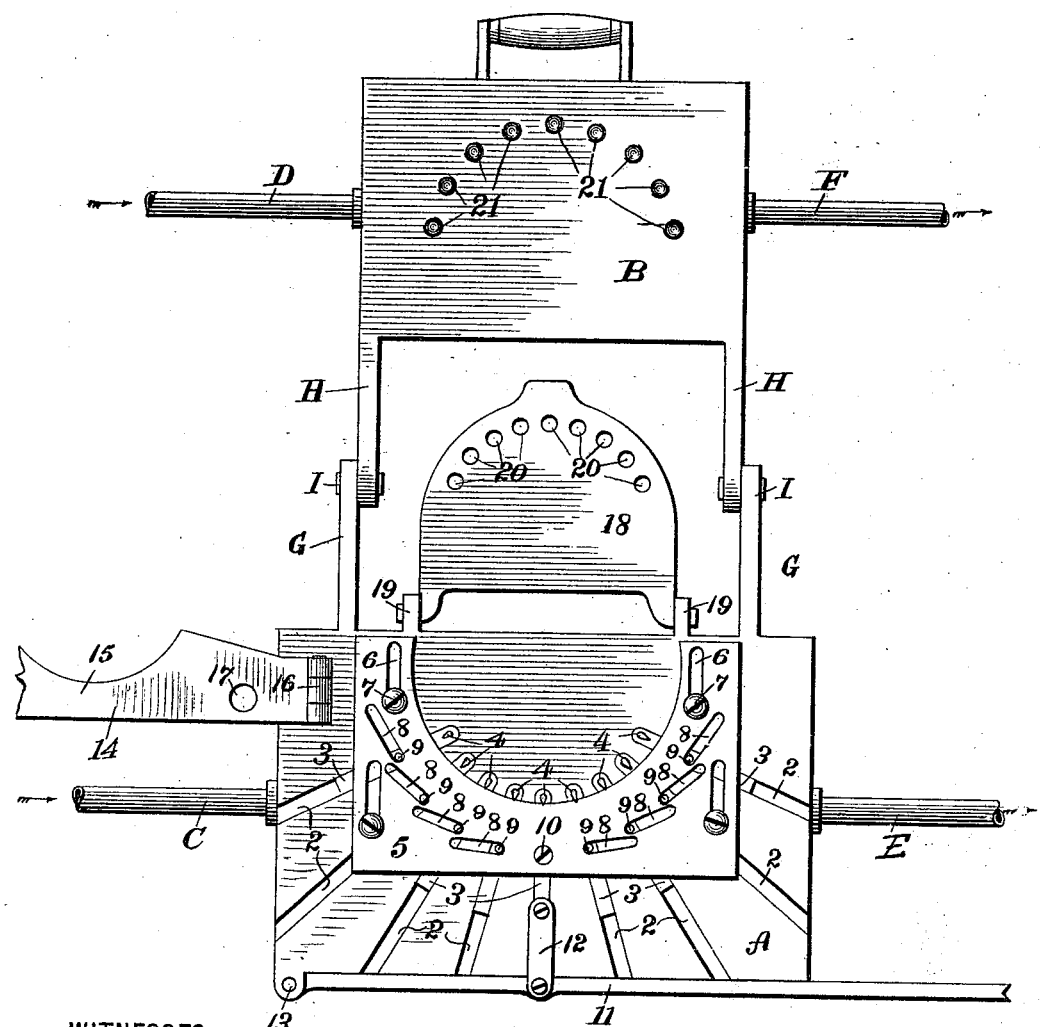
Figure 2:
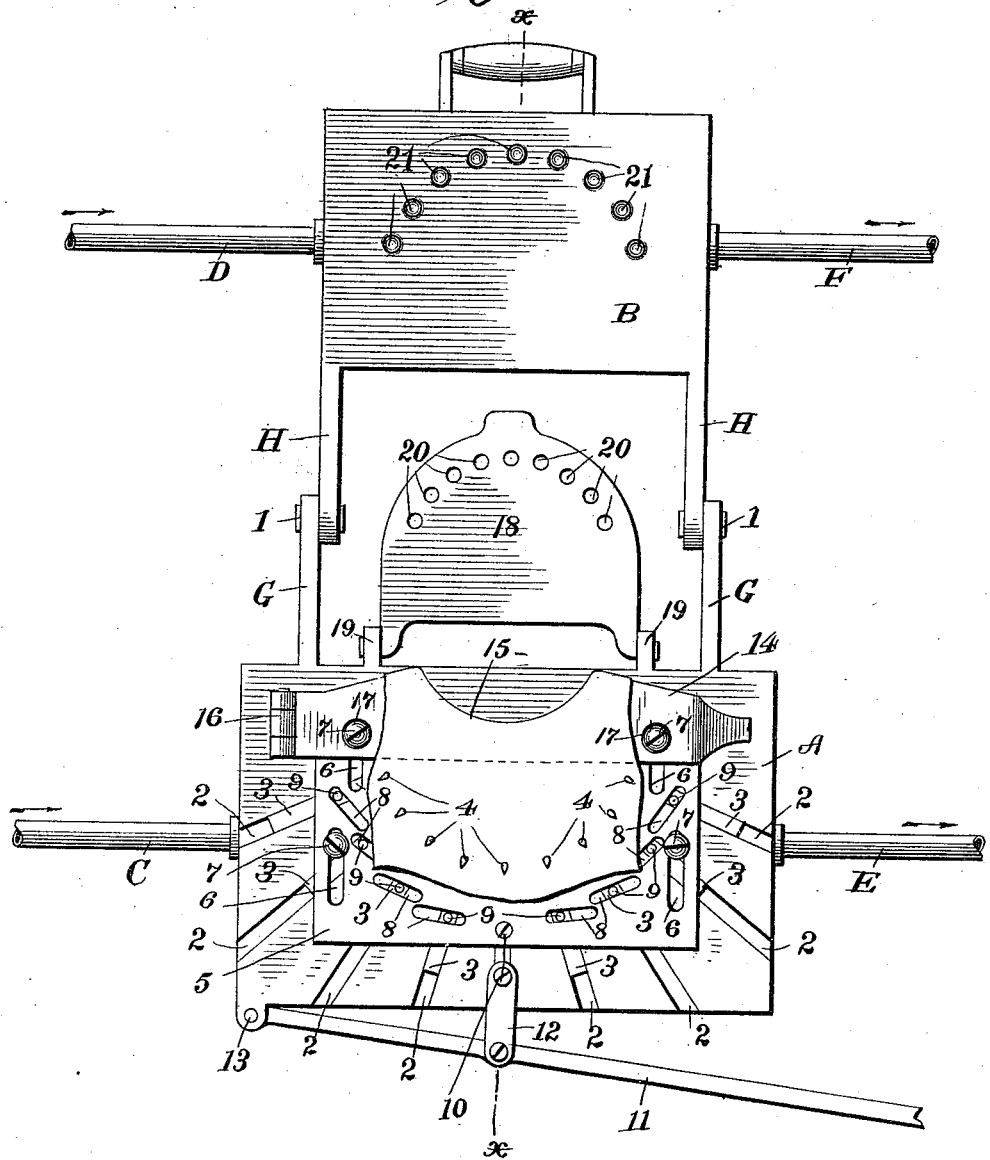
Figure 3:
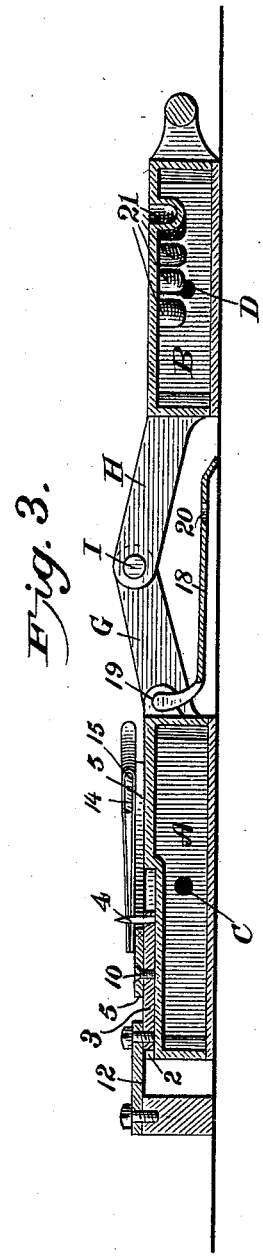

Figure 1 is a plan showing an apparatus constructed in accordance with my improvement, the parts being in normal position; Fig. 2, a view similar to Fig. 1, but showing the position of parts when a shield has been stretched, and Fig. 3, a section at the line $x$, $x$, of Fig. 2.

Similar letters and numerals denote like parts in the several figures.

Prior to my invention, machines for manufacturing seamless shields have been constructed, in which a form and stretching devices were provided, and pivoted steam-heated leaves were adapted to be swung directly against the shield material before stretching. Such a machine as this has, as I have stated, been built, but it has proved to be impractical, because the stretching of the stockinet faced rubber while in contact with the hot leaves initially vulcanized the rubber so that the elasticity of the latter was impaired to such a degree that the rubber broke in myriads of places, and a shield so made was not impervious to water or moisture. Many other obvious objections attach to the stretching of a shield during vulcanization, and it is a fact that a shield impervious to moisture has never been produced in this manner.

My present invention comprises stretching and vulcanizing devices, but the vulcanizing does not commence until the stretching is entirely completed. But I do not wish to be understood as setting forth any novelty in the broad idea of first stretching and then vulcanizing a dress shield, as this is the commonly practiced and, moreover, the only feasible way of making a seamless dress shield.

My invention is based upon the construction and arrangement of parts in an organized apparatus for stretching and vulcanizing seamless dress shields and will be readily understood from the following description.

A is a steam-chest which is supported by any suitable platform (not shown). B is also a steam chest, and C, D, are steam inlet pipes by which steam is introduced respectively within said chests A, B. E, F, are the usual outlet pipes leading from said chests. These chests have projecting arms G, H, pivoted together at I.

2 are radial channels in the face of the chest A, and 3 are stretcher-bars adapted to slide freely within said channels and provided with pins 4 projecting upwardly from the outer ends thereof.

5 is a stretcher-plate on the chest A and having slots 6 through which screws 7 extend within the chest A, whereby said plate may be properly guided.

8 are cam-slots within the plate 5 through which studs 9 project from the bars 3. These cam-slots are so formed that when the plate 5 is drawn back the bars 3 will be retracted within the channels 2.

The center bar 3 is secured to the plate 5 by a screw 10, and the rear end of this bar is connected to an operating lever 11 by a link 12 whose respective ends are pivoted to said bar and lever. This lever is pivoted at 13 to the bed-plate and operates to advance and retract the stretcher-plate.

14 is the form which is crescent-shaped at its front edge as seen at 15. This form is preferably hinged to the chest A as seen at 16 and is provided with perforations 17, so that when said form is swung inward it will be secured in position by the screws 7, as shown at Fig. 2. Of course it is not necessary that the form should be hinged or otherwise secured to the chest A except by some such means as the screws 7 and perforations 17, it being essential in this connection to merely provide any ordinary device whereby the form will be held stationary during the manufacture of the shield.

18 is a pinning-on leaf pivoted to the chest A between ears 19 and having perforations 20 extending in the arc of a circle. The parts being in the position shown at Fig. 1, the leaf 18 will when folded inward force the shield material on the pins 4, which latter will register through the perforations 20.

The stretching and pinning-on devices which I have hereinbefore described and which are shown in the drawings, are identical in structure and function with the similar devices shown and described in my pending application, Serial No. 395,554, and I therefore make no claim herein to said devices, and further description of the operation of said devices is thought to be unnecessary.

After the shield had been shaped by the operation of the lever 11, as shown at Fig. 2, the chest B is folded inward upon the stretched shield. Live steam is preferably constantly supplied to the chests so that the latter are always in condition for performing their function.

The chest B is provided with depressions 21, and when said chest is folded inward, as above set forth, said depressions will inclose the pins 4 and thereby secure them in distended position, whereby the shield is prevented from sagging back during the first stages of vulcanization.

I claim—

1. In an apparatus for manufacturing seamless dress shields, the combination of a pair of steam chests one of which is stationary and constitutes a bed while the other is hinged to the stationary chest and adapted to be folded thereon, a form removably secured to the stationary chest, stretching devices permanently secured on the face of the stationary chest, and means for operating said devices, substantially as set forth.

2. In an apparatus for manufacturing seamless dress shields, the combination of a stationary steam-chest and a foldable steam chest pivoted thereto, stretching devices mounted and operated on the face of said stationary chest and a form secured to the latter, and means for operating said devices in advance of and independent of said foldable chest, substantially as set forth.

3. The combination of the stationary steam chest having operatively secured on the face thereof the form and stretching devices, and the foldable chest having depressions adapted to engage with the stretching devices to lock the latter in distended position during vulcanization, substantially as set forth.

In testimony whereof I affix my signature in presence of two witnesses.

SAMUEL S. WILLIAMSON.

Witnesses:
F. W. SMITH, Jr.,
J. S. FINCH.